(12) United States Patent
Chameroy et al.

(10) Patent No.: US 10,542,836 B2
(45) Date of Patent: Jan. 28, 2020

(54) BAYONET PRESSURE COOKER AND A CORRESPONDING METHOD OF FABRICATION

(71) Applicant: SEB S.A., Ecully (FR)

(72) Inventors: Eric Chameroy, Veronnes (FR); Hubert Chaillard, Longeau (FR)

(73) Assignee: SEB S.A., Ecully (FR)

( * ) Notice: Subject to any disclaimer, the term of this patent is extended or adjusted under 35 U.S.C. 154(b) by 364 days.

(21) Appl. No.: 15/081,303

(22) Filed: Mar. 25, 2016

(65) Prior Publication Data
US 2016/0278565 A1    Sep. 29, 2016

(30) Foreign Application Priority Data

Mar. 26, 2015    (FR) .................................... 15 52579

(51) Int. Cl.
*A47J 27/08*    (2006.01)

(52) U.S. Cl.
CPC ................. *A47J 27/0806* (2013.01)

(58) Field of Classification Search
CPC ................................................ A47J 27/0806
USPC ............ 99/412; 219/431, 440; 220/293, 298
See application file for complete search history.

(56) References Cited

U.S. PATENT DOCUMENTS

| | | | | |
|---|---|---|---|---|
| 1,558,235 A | * | 10/1925 | Burton | ..................... B65D 7/02 220/293 |
| 1,596,367 A | * | 8/1926 | Miller | ................ B65D 43/0229 220/293 |
| 2,583,085 A | | 1/1952 | Campbell | |
| 2,600,703 A | | 6/1952 | Strom | |
| 2,660,330 A | | 11/1953 | Keller | |
| 3,146,682 A | * | 9/1964 | Price | ..................... B60T 13/563 92/99 |
| 3,653,533 A | | 4/1972 | Mortensen | |
| 3,876,385 A | | 4/1975 | Markus | |
| 4,276,990 A | | 7/1981 | Chiodo | |
| 5,768,976 A | | 6/1998 | Suk | |

(Continued)

FOREIGN PATENT DOCUMENTS

| | | |
|---|---|---|
| BR | 8601076 A | 10/1987 |
| CH | 571335 A5 | 1/1976 |

(Continued)

OTHER PUBLICATIONS

Search Report and Written Opinion issued by Institut National de la Propriété Industrielle, for corresponding application French Patent Application No. 1552579, dated Feb. 2, 2016, 8 pages.
Search Report and Written Opinion issued by Institut National de la Propriété Industrielle, for French Patent Application No. 1554997, dated Mar. 31, 2016, 6 pages.

(Continued)

*Primary Examiner* — Ibrahime A Abraham
*Assistant Examiner* — John J Norton
(74) *Attorney, Agent, or Firm* — Loeb & Loeb LLP

(57) ABSTRACT

The invention relates to an appliance for cooking food under pressure. The appliance includes a vessel and a lid for locking relative to the vessel to cooperate therewith to form a cooking enclosure suitable for rising in pressure. The appliance also includes bayonet locking means forming first and second series of projections that are secured respectively to the shell of the lid and to the shell of the vessel which cooperate with one another to lock the lid to the vessel. Each projection of at least one of said series is adjacent to a respective opening formed through the corresponding shell.

23 Claims, 6 Drawing Sheets

(56) References Cited

U.S. PATENT DOCUMENTS

| | | | | |
|---|---|---|---|---|
| 6,425,320 B1* | 7/2002 | Chameroy | .......... | A47J 27/0806 126/373.1 |
| 2014/0360384 A1* | 12/2014 | Kim | .................... | A47J 27/0806 99/403 |

FOREIGN PATENT DOCUMENTS

| | | | |
|---|---|---|---|
| CH | 694356 | A5 | 12/2004 |
| CN | 2389593 | Y | 8/2000 |
| CN | 2469839 | Y | 1/2002 |
| CN | 201624512 | U | 11/2010 |
| CN | 102166092 | B | 8/2011 |
| CN | 102349791 | A | 2/2012 |
| CN | 203000535 | U | 6/2013 |
| DE | 3703448 | A1 | 8/1988 |
| DE | 29508504 | U1 | 9/1995 |
| EP | 0743036 | A1 | 11/1996 |
| EP | 2258243 | A1 | 12/2010 |
| EP | 2732736 | A1 | 5/2014 |
| FR | 2782257 | A1 | 2/2000 |
| FR | 2783687 | A1 | 3/2000 |
| GB | 641540 | A | 8/1950 |
| GB | 657982 | A | 10/1951 |
| JP | S5898018 | U | 7/1983 |
| WO | 0143605 | A1 | 6/2001 |
| WO | 2013039332 | A2 | 3/2013 |

OTHER PUBLICATIONS

Search Report and Written Opinion issued by Institut National de la Propriété Industrielle, for French Patent Application No. 1555000, dated Mar. 22, 2016, 6 pages.

Search Report and Written Opinion issued by Institut National de la Propriété Industrielle, for French Patent Application No. 1555001, dated Mar. 22, 2016, 6 pages.

Search Report and Written Opinion issued by Institut National de la Propriété Industrielle, for French Patent Application No. 1554999, dated Mar. 22, 2016, 6 pages.

Office Action dated May 7, 2018 for U.S. Appl. No. 15/172,048 (pp. 1-7).

Notice of Allowance dated May 23, 2018 for U.S. Appl. No. 15/172,054 (pp. 1-5).

International Searching Authority, International Search Report, International Application No. PCT/FR2015/050786, dated Jul. 10, 2015, 7 pages.

International Searching Authority, Written Opinion, international Application No. PCT/FR2015/050786, dated Oct. 1, 2015, 5 pages.

International Searching Authority, Written Opinion, in International Application No. PCT/FR2015/050786, dated Oct. 1, 2015, 10 pages.

Search Report issued by Institut National de la Propriete Industrielle, for French Patent Application No. 1653140, dated Nov. 23, 2016, 2 pages.

\* cited by examiner

BAYONET PRESSURE COOKER AND A CORRESPONDING METHOD OF FABRICATION

CROSS-REFERENCES TO RELATED APPLICATIONS

This application claims priority to, and the benefit of, French Patent Application No. FR-15 52579, filed Mar. 26, 2015, entitled "A Bayonet Pressure Cooker And A Corresponding Method Of Fabrication," the entire content of which is incorporated herein by reference.

BACKGROUND

The present invention relates to the general technical field of appliances for cooking food under pressure, and in particular it relates to domestic appliances of the pressure cooker type for forming a cooking enclosure that is capable of rising in pressure in order to cook food contained therein under pressure from vapor.

SUMMARY OF THE INVENTION

The present invention relates more particularly to an appliance for cooking food under pressure that comprises at least:

a vessel and a lid for locking relative to the vessel to cooperate therewith to form a cooking enclosure suitable for rising in pressure; and bayonet locking means forming first and second series of projections that are secured respectively to the shell of the lid and to the shell of the vessel and that are for cooperating with one another in order to lock the lid relative to the vessel.

The present invention also relates to a method of fabricating an appliance for cooking food under pressure and comprising at least:

a vessel and a lid for locking relative to the vessel to cooperate therewith to form a cooking enclosure suitable for rising in pressure; and bayonet locking means forming first and second series of projections that are secured respectively to the shell of the lid and to the shell of the vessel and that are for cooperating with one another in order to lock the lid relative to the vessel.

Appliances for cooking food under pressure, in particular for home use, are well known. They generally comprise a metal vessel that is designed to receive a likewise metal cover that is fitted thereto in leaktight manner via a flexible annular sealing gasket, thereby constituting a cooking enclosure capable of rising in pressure.

The lid is designed to be connected to the vessel via locking means enabling the pressure cooker to go from a configuration in which the lid is locked relative to the vessel, in which the cooking enclosure is capable of rising in pressure, and an unlocking configuration in which the lid can be freely separated from the vessel.

There exist various types of locking means that are well known in the prior art. One of the most widespread systems is the bayonet locking system that relies on using ramps on the vessel and on the lid that slide and come to bear mutually against one another when the lid is moved in rotation so as to provide a mechanical retention connection that prevents the vessel and the lid from separating under the effect of the rise in pressure. The lid ramps are conventionally formed by localized folding towards the inside of the annular dropped edge of the lid, while the vessel ramps are obtained by folding and cutting the free top edge of the vessel.

Such a bayonet locking system generally gives satisfaction, but it nevertheless presents certain drawbacks.

In particular, it can be difficult for users to position the lid correctly relative to the vessel, in particular because it is difficult to determine the positions of the lid ramps, particularly for an inexperienced user. Likewise, users of known bayonet pressure cookers can find it difficult to ensure good mutual engagement between the vessel ramps and the lid ramps. In addition, and as a result of their specific design, the vessel ramps and the lid ramps present resistance to deformation, and particularly in bending, that is far from being optimal. This makes it necessary to have recourse to ramps of considerable thickness that extend along the perimeter of the vessel (and respectively along the perimeter of the lid) over relatively long lengths, so as to ensure that the ramps of the vessel and of the lid provide a connection that is capable of satisfying standards and specifications, which are particularly demanding for home pressure cookers.

In particular, certain standards specify that a locking mechanism of a bayonet pressure cooker must be capable of withstanding a test pressure of 500 kilopascals (kPa) without the vessel and the lid separating. The conventional bayonet locking systems used in known pressure cookers thus rely on using lid and vessel ramps that are very long, thereby giving the pressure cooker a relatively unattractive appearance, in particular because of the relatively unstructured appearance of the edge of the vessel, which has notches formed therein (for engaging the lid ramps) that extend over at least half of the perimeter of the edge of the vessel.

The bayonet locking systems used in known pressure cookers thus necessarily lead to very specific shapes and dimensions for the edges of the vessel and of the lid that have, in particular, the result of limiting options for adding accessories to the pressure cookers in question, and that also have a significant effect on their general appearance. Furthermore, because of the relatively long length of the vessel and lid ramps, it is necessary to turn the lid relative to the vessel through an angular stroke that is relatively large in order to cause all of the lid ramps to coincide in full with all of the corresponding vessel ramps, and thus obtain locking that is effective and reliable. This large angular stroke can also be difficult to achieve because of the friction involved between the vessel and lid ramps (and also against the sealing ring).

In summary, known locking systems for bayonet pressure cookers are not at all optimized specifically in terms of their mechanical behavior (mechanical strength and ability to withstand deformation), in terms of their weight, in terms of their attractiveness, in terms of their ergonomics, and in terms of their ease of use. Specifically concerning ease of use, it is found that the capacity of known bayonet locking systems for suggesting how they ought to be used in a natural and intuitive manner (which capacity is generally referred to as "affordance") is far from being optimal.

Consequently, the invention proposes remedying the various drawbacks set out above and proposes a novel pressure cooking appliance in which the locking means are of particularly high performance, in particular in terms of ease of use and resistance to deformation, while also being light, safe, easy to handle, and presenting good affordance properties and more attractive appearance.

Another object of the invention is to propose a novel pressure cooking appliance provided with locking means that can be fabricated in simple manner and at reduced cost, while being particularly robust and reliable.

Another object of the invention is to provide a novel pressure cooking appliance that provides a high level of safety in use.

Another object of the invention is to propose a novel pressure cooking appliance in which the locking means can be fabricated using industrial tooling that operates on principles that are well tried and tested.

Another object of the invention seeks to propose a novel pressure cooking appliance of design that facilitates properly positioning the lid relative to the vessel.

Another object of the invention seeks to propose a novel pressure cooking appliance of design that enables the user to make sure easily and intuitively that the lid is correctly locked relative to the vessel.

Another object of the invention seeks to propose a novel method of fabricating a pressure cooking appliance that relies on steps that are particularly simple and inexpensive, while making it possible to obtain a cooking appliance having locking means that are extremely effective and safe.

Another object of the invention is to propose a novel method of fabricating a pressure cooking appliance that can be performed using industrial tools that are simple and inexpensive.

The objects of the invention are achieved using an appliance for cooking food under pressure and comprising at least:

a vessel and a lid for locking relative to the vessel to cooperate therewith to form a cooking enclosure suitable for rising in pressure; and bayonet locking means forming first and second series of projections that are secured respectively to the shell of the lid and to the shell of the vessel and that are for cooperating with one another in order to lock the lid relative to the vessel;

said appliance being characterized in that each projection of at least one of said series is adjacent to a respective opening formed through the corresponding shell.

The objects of the invention are also achieved with a method of fabricating an appliance for cooking food under pressure comprising at least:

a vessel and a lid for locking relative to the vessel to cooperate therewith to form a cooking enclosure suitable for rising in pressure; and bayonet locking means forming first and second series of projections that are secured respectively to the shell of the lid and to the shell of the vessel and that are for cooperating with one another in order to lock the lid relative to the vessel;

said method being characterized in that it comprises:

a step of forming a plurality of openings through at least one of said shells; and a step of forming a plurality of projections each adjacent to a respective opening of said plurality of openings, said plurality of projections forming at least one of said first and second series of projections.

Other features and advantages of the invention can be seen in greater detail on reading the following description made with reference to the accompanying drawings, given purely by way of non-limiting illustration, and in which:

DETAILED DESCRIPTION

Figure 1:
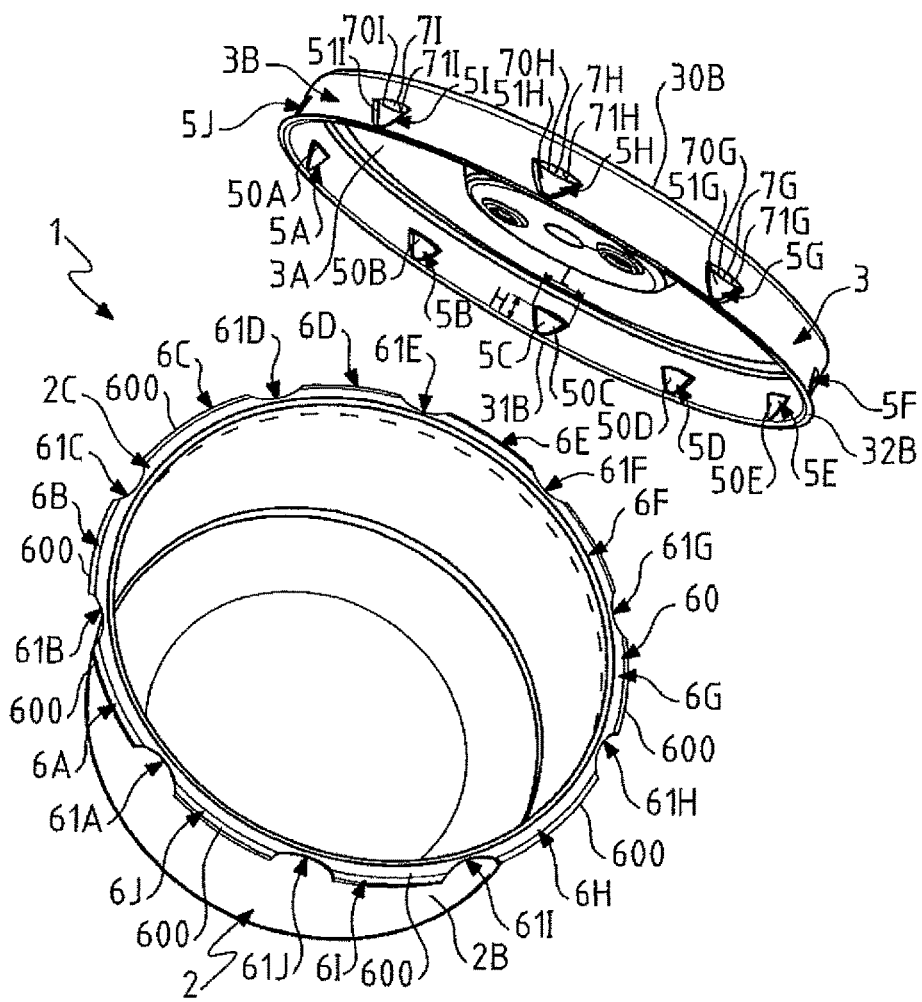
FIG. 1 is a diagrammatic perspective view showing a first embodiment of an appliance for cooking food under pressure in accordance with the invention, with the lid separate from the vessel.

As shown in the figures, the invention relates to an appliance 1 for cooking food under pressure for the purpose of cooking various foods at a pressure level higher than atmospheric pressure, in the presence of vapor, e.g. steam. Said vapor is generated by heating a cooking liquid within the appliance 1 in the presence of food, which liquid may be an aqueous liquid, for example. The appliance 1 of the invention is preferably for domestic use, it nevertheless being understood that the invention can also apply to professional or semi-professional appliances.

The appliance 1 in accordance with the invention is designed to rise in pressure exclusively under the effect of a heat source (incorporated or external), without external pressure being supplied. The appliance 1 for cooking food under pressure thus constitutes a pressure cooker, preferably intended for placing on an independent cooking plate in order to heat its contents.

The cooking appliance 1 in accordance with the invention comprises at least one vessel 2 forming a cooking container that is to receive the food for cooking and, in this example, it is substantially circularly symmetrical about a central axis X-X' that extends in a direction close to the vertical direction when the appliance 1 is in normal operation, i.e. when it is standing on a horizontal plane. The vessel 2 is conventionally made from a metal such as stainless steel or aluminum, or any other suitable material, that may optionally be coated (e.g. in a layer of ceramic, polytetrafluoroethylene (PTFE), enamel, varnish, . . . ). The vessel 2 has a bottom 2A that may for example be a multilayer heat-conductive bottom that is secured to the remainder of the vessel 2 by any appropriate technique (e.g. hot forging). The vessel 2 also has an annular side wall 2B extending upwards between said bottom 2A and a free top edge 2C, which in this example is circular in shape, and which defines an opening giving access to the inside of the vessel 2. The shape of the free top edge 2C is described in greater detail below with reference to the means for locking the appliance 1. The vessel 2 may also have grip members, such as vessel handles 2D, 2E (cf. FIGS. 17 to 19), there preferably being two of them, which members may be fastened by way of example to the side wall 2B of the vessel 2 in diametrically opposite positions about the central axis X-X'.

The appliance 1 according to the invention also has a lid 3 for associating with the vessel 2 in order to cooperate therewith to form a cooking enclosure. More precisely, the lid 3 is for locking relative to the vessel 2 in order to cooperate therewith to form a cooking enclosure that is suitable for raising in pressure, i.e. a cooking enclosure that is hermetically sealed sufficiently to enable the pressure inside the appliance 1 to rise. In order to obtain this hermetic sealing characteristic, the appliance 1 advantageously includes a sealing gasket such as a flexible ring 4, e.g. made of elastomer, for placing between the lid 3 and the vessel 2, thus serving to prevent any uncontrolled leakage of vapor and/or air between the inside of the enclosure and the outside.

In conventional manner, the lid 3 is made from a metal such as stainless steel or aluminum, or any other appropriate material that may optionally be coated (e.g. with a layer of ceramic, PTFE, enamel, varnish, . . . ). It is advantageously complementary in shape to the vessel 2, e.g. being generally disk-shaped, and, when it is fitted and locked on the vessel, it advantageously extends in a mean plane that is substantially parallel to the mean plane in which the bottom 2A of the vessel 2 extends (i.e. a plane that is specifically substantially horizontal). In the embodiment shown in the figures, the shell of the lid 3 includes a disk-shaped cover element 3A of shape and dimensions that are complementary to the shape and dimensions of the access opening defined by the free top edge 2C of the annular wall 2B of the vessel 2. In the embodiments shown in the figures, the shell of the lid 3 also includes an annular belt 3B, e.g. of substantially cylindrical or frustoconical shape, that extends downwards from a first circular edge 30B secured to the disk-shaped cover element 3A (specifically at its periphery) and a second free circular edge 31B, which by way of example is itself extended by a collar 32B (absent in the variants shown in FIGS. 9, 10, and 17 to 19). As shown in the figures, when the lid 3 is associated with the vessel 2 to form the cooking enclosure, the disk-shaped cover element 3A extends generally in a mean plane that is horizontal, i.e. specifically parallel to the mean plane in which the bottom 2A of the vessel 2 extends, while the annular belt 3B extends substantially vertically, i.e. parallel to the central axis X-X', the terminal collar 32B extending substantially horizontally. Naturally, this does not exclude in any way the disk-shaped cover element 3A being slightly rounded or locally curved, as shown in the figures and as is well known in practice.

In the embodiments shown in the figures, the annular belt 3B is formed by a dropped edge extending downwards from the periphery of the disk-shaped cover element 3A. In these embodiments, the lid 3 is designed to overlie the top of the vessel 2 in substantially fitted manner so that the annular belt 3B surrounds the outside of the top of the annular side wall 2B and the free top edge 2C. Nevertheless, it is entirely possible to envisage the annular belt 3B being intended instead for inserting inside the vessel 2, so as to be surrounded by and contained inside the vessel 2, without thereby going beyond the ambit of the invention.

The appliance 1 for cooking food under pressure in accordance with the invention advantageously includes pressure regulator means (not shown), e.g. a valve, that are preferably mounted on the lid 3 and that are arranged so as to maintain the pressure that exists inside the cooking enclosure at a substantially constant predetermined value, referred to as the "operating pressure", which pressure exceeds atmospheric pressure by a value that may, for example, lie substantially in the range 10 kPa to 120 kPa, and that is preferably about 100 kPa. The general principle on which such pressure regulator means operate is itself well known so there is no need to describe it in greater detail herein.

Figure 2:
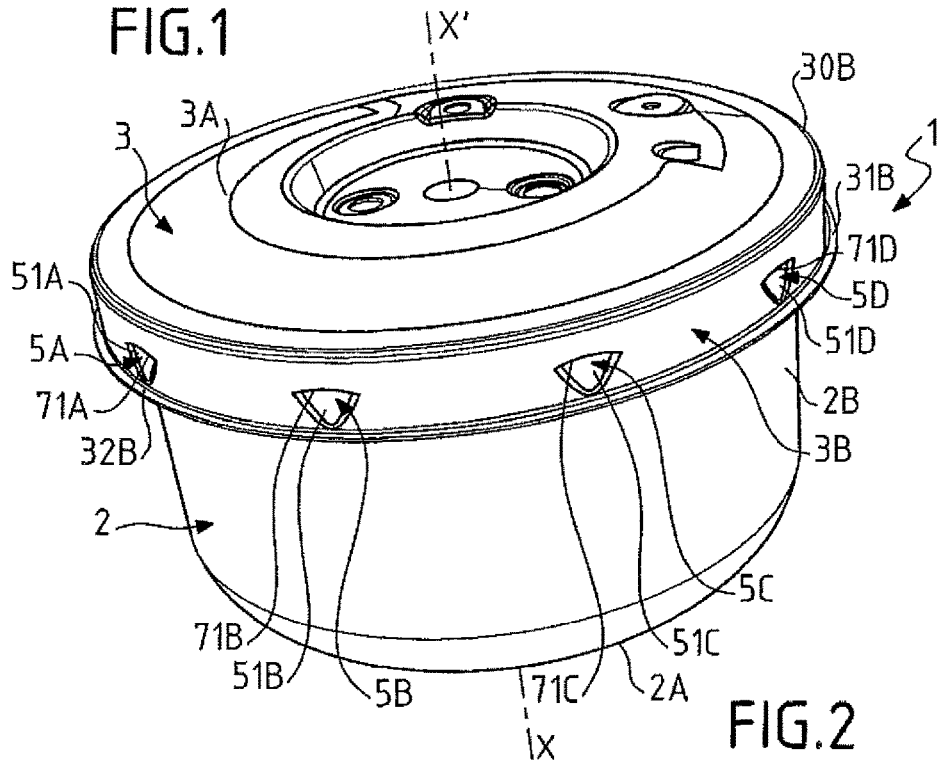
FIG. 2 is a diagrammatic perspective view showing the FIG. 1 appliance with the lid in place and locked on the vessel.
Figure 3:
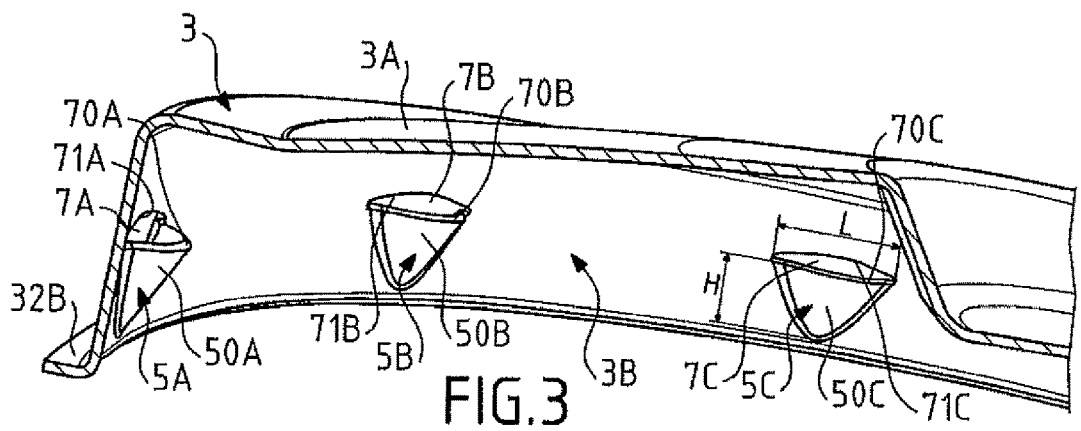
FIG. 3 is a fragmentary section view showing the lid of the appliance in FIGS. 1 and 2.
Figure 4:
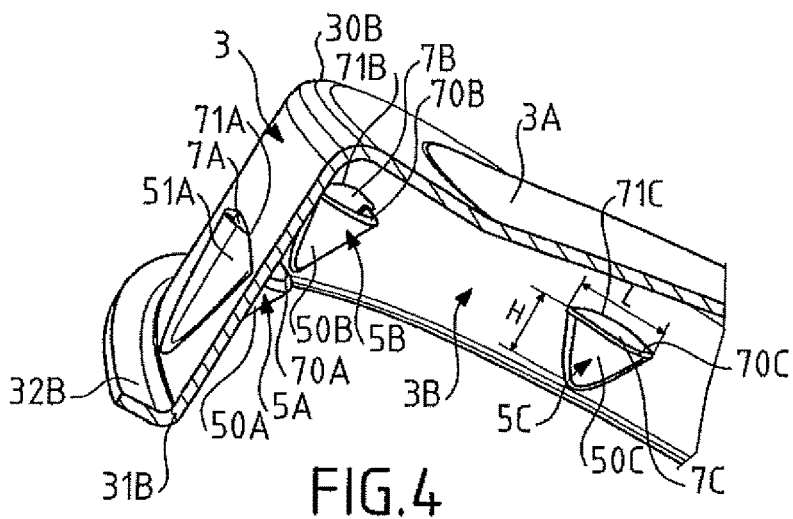
FIG. 4 is another section view showing the FIG. 3 lid.
Figure 5:
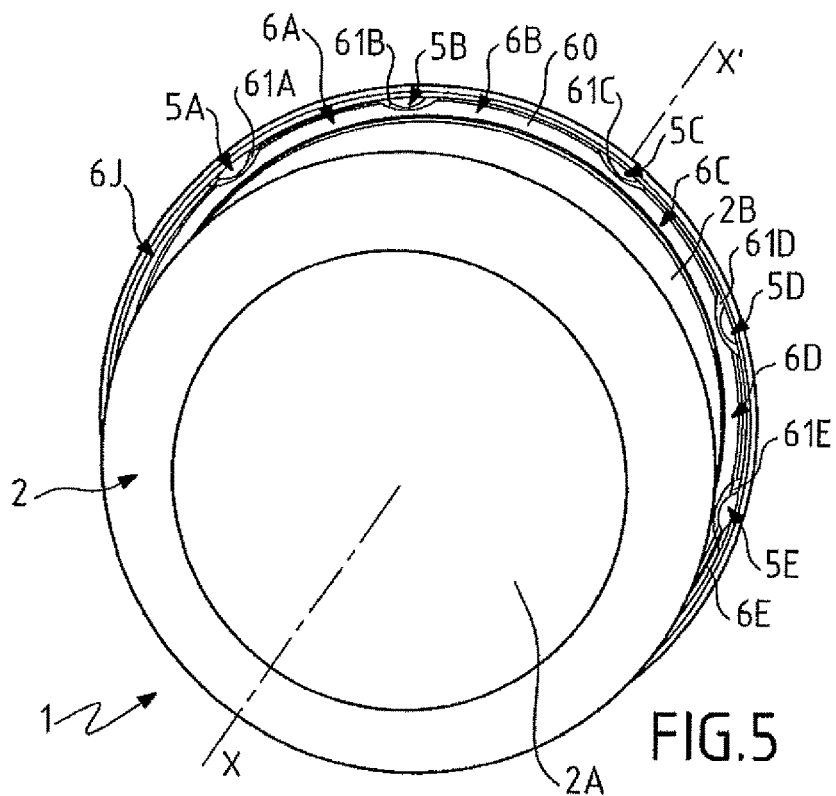
FIG. 5 is a diagrammatic perspective view seen partially from below showing the appliance of FIGS. 1 and 2 with the lid fitted on the vessel, against the free top edge of the vessel, in a configuration ready for locking.
Figure 6:
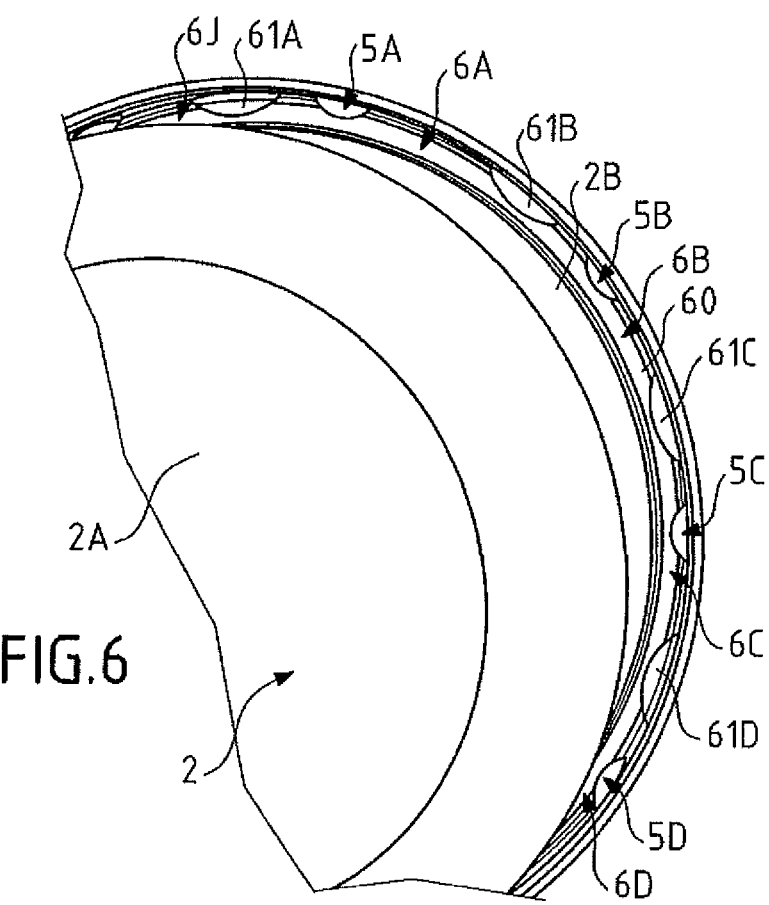
FIG. 6 is an incomplete diagrammatic perspective view seen in part from below showing the FIG. 1 appliance with the lid fitted and locked on the vessel.

The appliance 1 for cooking food under pressure may include other operating members (e.g. a pressure-sensitive safety finger, an excess pressure safety valve, etc.) that are not shown in the figures, which show only lids that are "bare" for the purposes of simplicity and concision of description. FIGS. 1 and 2 serve in particular to visualize various orifices formed through the lid 3 that are for putting the inside of the cooking enclosure into communication with various operating members (operating valve, safety valve, safety finger, . . . ) that are for mounting on the lid.

The vessel 2 and the lid 3 thus constitute respective complementary shells that are preferably made of metal, and that, once they have been associated with each other, form a resulting metal shell defining a closed volume within which food is to be cooked under pressure from vapor.

The appliance 1 in accordance with the invention also has means for locking the lid 3 relative to the vessel 2 so as to enable the cooking enclosure formed by associating the lid 3 and the vessel 2 to reach at least its operating pressure without any risk of the lid 3 escaping under the effect of the pressure that exists within the enclosure. The term "locking means" is used herein to designate means that are designed to ensure that the vessel 2 and the lid 3 are mechanically connected together in a manner that is sufficiently robust to prevent the lid 3 from separating from the vessel 2 under the effect of pressure rising within the cooking enclosure.

In accordance with the invention, said locking means are bayonet locking means, i.e. locking means that enable the lid 3 to be attached to the vessel 2 by relative rotation between the lid 3 and the vessel 2, preferably about the central axis X-X', so as to cause the lid 3 to pass from a configuration ready for locking, in which the lid is placed on the vessel 2 and rests freely thereon, to a locking configuration in which the vessel 2 and the lid 3 interact in order to prevent them from being separated freely. For this purpose, the bayonet locking means of the cooking appliance 1 form a first series of projections 5A-5J and a second series of projections 6A-6J that are secured respectively to the shell of the lid 3 and to the shell of the vessel 2, and that are designed to cooperate mutually in order to lock the lid 3 relative to the vessel 2. As is well known, the projections 5A-5J, 6A-6J in each series are designed to cooperate in pairs, i.e. each projection of one of said series is designed to be moved by turning the lid 3 relative to the vessel 2 so as to pass under a corresponding projection of the other series. This mechanical cooperation between the projections 5A-5J, 6A-6J of each series thus provides interlocking that prevents any unwanted separation of the lid 3 and the vessel 2, since in reaction to a force seeking to separate the lid 3 and the vessel 2 in the vertical direction (represented by the central axis X-X'), the projections that are superposed in pairs come into mutual blocking engagement.

In the embodiments shown in the figures, the projections 5A-5J of the first series (secured to the shell of the lid 3) project radially towards the inside of the lid 3, while the projections 6A-6J of the second series (secured to the shell of the vessel 2) project radially outwards from the shell of the vessel 2. Nevertheless, in an alternative embodiment that is not shown, it is entirely possible to envisage the projections 5A-5J of the first series projecting towards the outside of the lid 3 and the projections 6A-6J of the second series projecting from said shell of the vessel 2 towards the center of the vessel. The invention is thus not limited to a particular configuration of the locking ramps, the essential point being that the projections of the lid 5A-5J and of the vessel 6A-6J form respective lid and vessel ramps that cooperate with one another by turning the vessel 2 relative to the lid 3, specifically about the axis X-X', so that the lid ramps become positioned under (or optionally over) the vessel ramps so as to establish a mechanical connection between the vessel 2 and the lid 3 that is capable of withstanding the internal pressure inside the cooking enclosure. Each projection 5A-5J is advantageously formed by a piece of metal that is solid, i.e. without perforations.

In accordance with the invention, each projection 5A-5J of at least one of said series of projections is adjacent to a respective opening 7A-7J formed through the corresponding shell (i.e. the shell to which the projections of the series in question are connected). As shown in the figures, the opening is a through opening formed through the entire thickness of the shell in question, thereby forming a through orifice.

The term "adjacent" is used herein to mean that each projection 5A-5J is in the immediate vicinity of the respective opening 7A-7J, and for example borders and/or defines a portion of said opening 7A-7J. By way of example, this means that each projection 5A-5J in question corresponds to an adjoining opening 7A-7J. The number of projections 5A-5J in question is thus specifically equal to the number of corresponding adjacent openings 7A-7J. Advantageously, each projection 5A-5J is connected to the corresponding shell (of the lid or of the vessel as the case may be) via an edge that also contributes to defining the opening 7A-7J that is respectively adjacent thereto. In this embodiment shown in the figures, each projection 5A-5J thus shares at least one edge in common with the respective opening 7A-7J that is adjacent thereto.

In accordance with the embodiment shown in the figures, each opening 7A-7J preferably extends in a first surface (e.g. a cylinder in the example shown in the figures), while each corresponding projection 5A-5J preferably extends in a surface that is substantially not parallel to said first surface.

Advantageously, each projection 5A-5J is connected to the shell from which it extends (of the lid and/or of the vessel) via an edge having at least a portion thereof that is situated above or below the corresponding adjacent opening 7A-7J, such that said edge and said corresponding adjacent opening 7A-7J are in vertical alignment, at least in part.

In the embodiments shown in the figures, the projections 5A-5J adjacent to the respective openings 7A-7J form the projections 5A-5J of the first series that are secured to the shell of the lid 3. As described in greater detail below, each projection 5A-5J of the first series of projections in the examples shown in the figures is constituted by a locally deformed portion of the shell of the lid 3, specifically forming a volume element that projects radially towards the inside of the lid 3, while the projections 6A-6J of the second series of projections are by way of example (and as described in greater detail below) in the form of metal tongues that extend radially from the free top edge 2C of the vessel 2, specifically towards the outside of the vessel 2. Naturally, it is entirely possible as an alternative to envisage the projections 5A-5J that are secured to the shell of the lid 3 being formed by flat or volume elements that project towards the outside of the lid, while the projections 6A-6J that are secured to the vessel 2 are constituted by flat or volume elements that project towards the inside of the vessel 2. The invention thus relates to all possible combinations of projections (flat/volume, projecting inwards/outwards), insofar as at least one of the series of projections is associated with a plurality of corresponding openings 7A-7J, as described above.

Figure 7:
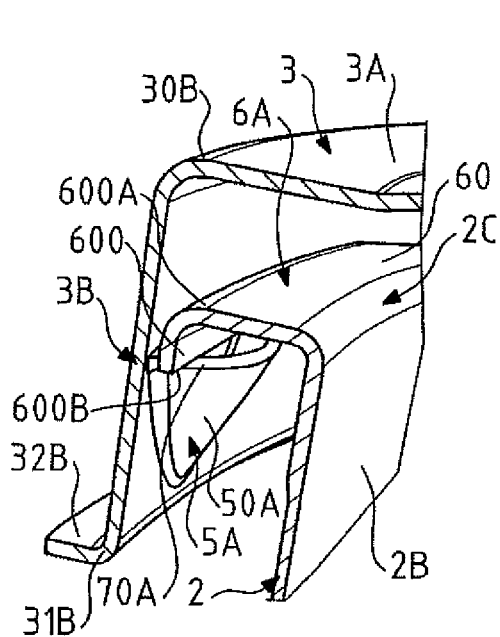
FIGS. 7 and 8 are diagrammatic section views on two respective section planes showing an embodiment detail of the FIG. 6 pressure cooker.

Advantageously, and as shown in the figures, the projections 6A-6J of the second series are formed by an annular rim 60 that projects outwards from the free top edge 2C, with notches 61A-61J for passing said projections 5A-5J of the first series being formed through said annular rim 60 in such a manner that the portions of said annular rims 60 that extend between the notches 61A-61J form vessel ramps that are to cooperate with the projections 5A-5J of the first series secured to the shell of the lid 3. The annular rim 60 is thus advantageously in the form of a substantially flat ring that extends substantially horizontally or that slopes downwards a little, and that has the notches 61A-61J formed therethrough, e.g. by cutting away the material forming the annular rim 60, the notches 61A-61J serving to pass the projections 5A-5J of the lid. The notches 61A-61J are advantageously of rounded profile complementary to the profile of the lid projections 5A-5J. Thus, when the lid 3 is placed over the vessel 2, the projections 5A-5J that project from the annular belt 3B can pass through the notches 61A-61J so as to become positioned below the annular rim 60. The lid 3 is then in a prelocking configuration, from which the locking configuration can be reached merely by causing the lid 3 to turn relative to the vessel 2 about the vertical axis X-X', thereby having the effect of angularly offsetting the projections 5A-5J of the lid 3 and the notches 61A-61J of the annular rim 60 so as to establish "bayonet" type locking. As can be seen in particular from FIGS. 1, 7, and 8, the annular rim 60 preferably includes a collar that extends substantially radially outwards from said free top edge 2C, together with a skirt 600 that extends substantially downwards between a top edge 600A secured to the collar and a free bottom edge 600B against which the projections 5A-5J of the first series (specifically forming the ramps of the lid 3) are to come to bear in order to lock the lid 3 relative to the vessel 2. This embodiment is found to be particularly advantageous mechanically speaking since it enables the vessel ramps to be given a particularly large second moment of area in the vertical direction X-X', thus leading to a mechanical connection being obtained between the vessel 2 and the lid 3 that is particularly stable and robust.

The skirt 600 is preferably discontinuous and is not present in register with the notches 61A-61J, even though, as an alternative, it is entirely possible to envisage the skirt 600 extending continuously around the entire perimeter of the annular rim 60, including the notches 61A-61J, without that going beyond the ambit of the invention.

As shown in the figures, said openings 7A-7J are preferably located in said annular belt 3A at a distance from said first and second circular edges 30B, 31B, so that each opening 7A-7J is bordered substantially continuously over its entire perimeter by the material constituting the belt 3B. The edge defining each opening 7A-7J is thus advantageously a closed edge, as contrasted by way of example to the open edge on the outside of a mere notch. Each of said openings 7A-7J is thus made through the thickness of the annular belt 3B of the lid 3, and specifically forms a through window that is obtained by removing material.

Thus, each projection 5A-5J is associated with a respective opening 7A-7J that is made through the corresponding shell (i.e. specifically the shell of the lid 3, and more precisely its annular belt 3B) and that is defined by at least one edge 70A-70J, and preferably by at least two opposite edges (e.g. a first longitudinal edge 70A-70J and a second longitudinal edge 71A-71J). Said edge 70A-70J preferably also contributes to defining said projection 5A-5J adjacent to said opening 7A-7J. In other words, said edge 70A-70J is advantageously common to the opening 7A-7J and to the corresponding projection 5A-5J, i.e. it contributes to bordering said opening 7A-7J and the associated projection 5A-5J. Preferably, said edge 70A-70J of said opening 7A-7J forms a bearing face against which a projection 6A-6J of the other series is to come to bear.

Preferably, said projection 5A-5J adjacent to the opening 7A-7J is formed by a deformed portion of the corresponding shell (specifically the shell of the lid 3, and more precisely its annular belt 3B), said deformed portion being obtained, by way of example, by die-stamping the corresponding shell. In other words, the localized radial deformation of the shell forming said deformed portion is obtained by localized plastic deformation of the material forming said shell. Having recourse to die-stamping makes it possible in a manner that is particularly simple, fast, and inexpensive, to obtain a deformed portion that is particularly rigid and robust, and that in particular presents excellent properties of withstanding bending in the vertical direction.

Figure 16:
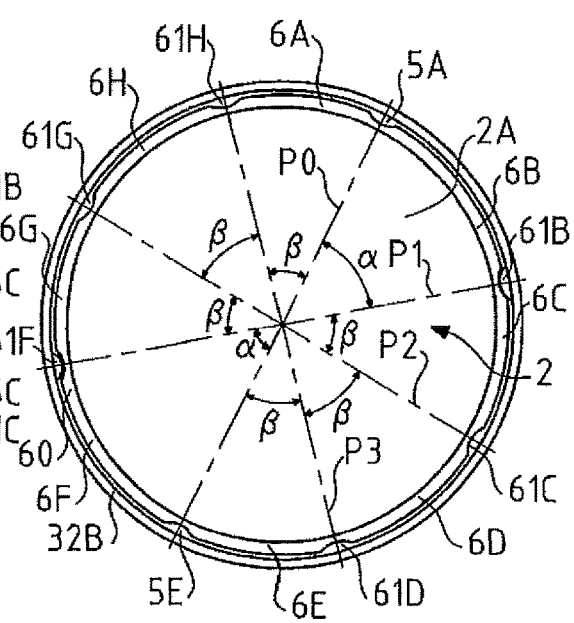
FIG. 16 is a view from beneath showing the pressure cooker of FIGS. 14 and 15 with the lid fitted on the vessel in an incorrect configuration that does not enable locking to take place.
Figure 17:
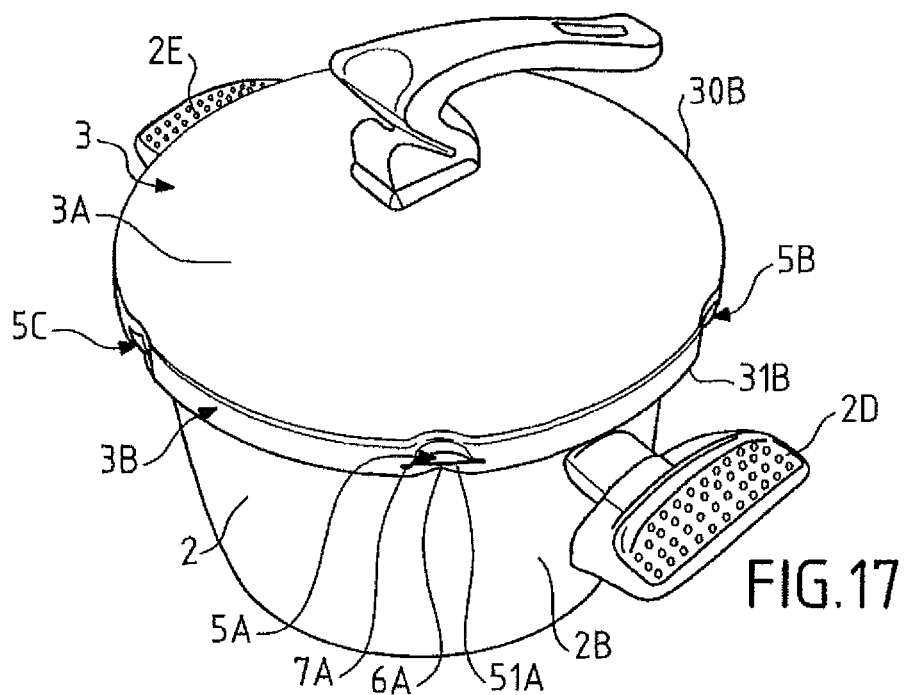
FIG. 17 is a general view of a cooking appliance in accordance with a second embodiment of the invention, with the lid locked on the vessel.
Figure 18:
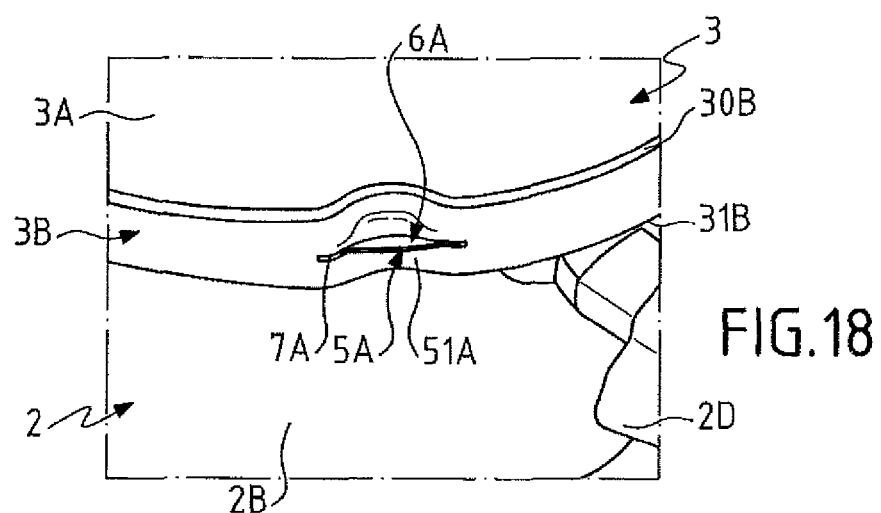
FIG. 18 is an enlarged view of a detail of FIG. 17.
Figure 19:
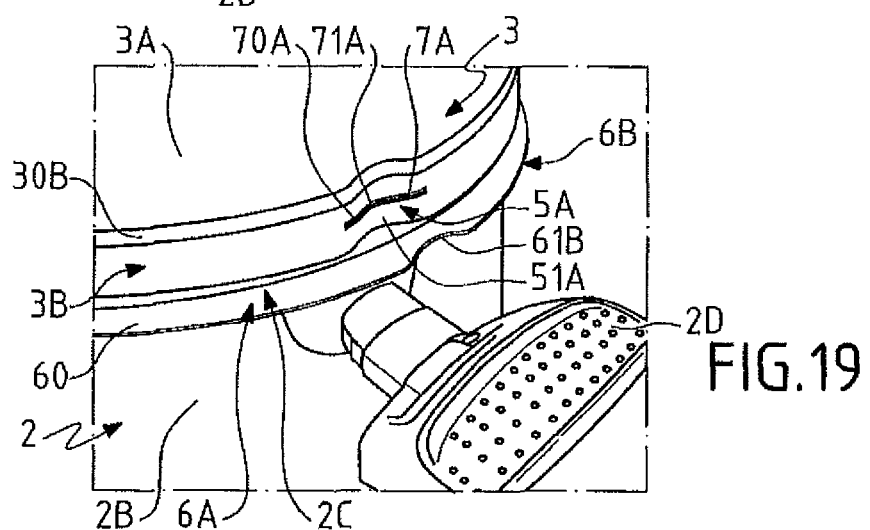
FIG. 19 shows the pressure cooker of FIGS. 17 and 18 with the lid unlocked and resting freely on the vessel.

Said edge 70A-70J advantageously forms part of said deformed portion. This means that the deformed envelope portion forming the projection 5A-5J in question is positioned relative to said respective opening 7A-7J in such a manner that at least a fraction of said edge 70A-70J (specifically the above-mentioned first longitudinal edge, corresponding to the bottom edge in the variants shown in FIGS. 1 to 19) is deformed radially (e.g. during the above-mentioned die-stamping operation) so as to present a profile that is curved and thus forms part of the corresponding projection 5A-5J. In the embodiments shown in FIGS. 1 to 16, said localized radial deformation consists in pushing the bottom edge 70A-70J of the opening 7A-7J towards the center of the lid 3 so as to cause the edge 70A-70J to pass from an initial profile (prior to radial deformation) that follows the curvature of the shell of the lid 3 (i.e. specifically the curvature of the annular belt 3B), to a curved profile that extends advantageously in a plane that is substantially horizontal, i.e. perpendicular to the central axis X-X'. In the examples of FIGS. 1 to 16, said edge 70A-70J of the opening 7A-7J forms the top of the corresponding projection 5A-5J, and in still more preferred manner forms a bearing face against which a projection of the other series (specifically a vessel ramp) is to come to bear. In other words, said edge 70A-70J of the curved profile is to slide under the ramp of the vessel 2 in order to lock the lid 3 relative to the vessel 2. Preferably, and as in the embodiment of FIGS. 1 to 16, only the bottom edge 70A-70J of the opening 7A-7J is deformed radially in order to present a curved profile, while the opposite top edge 71A-71J is substantially not deformed, and thus continues to lie in continuity with the corresponding shell (specifically the shell of the lid 3, and more precisely its annular belt 3B). Nevertheless, as in the embodiment of FIGS. 17 to 19, it is entirely possible to envisage that the localized radial deformation for forming the projection 5A-5J is performed in such a manner as to deform radially and in similar manner both the bottom edge 70A and the top edge 71A of the opening 7A-7J. In the embodiment of FIGS. 17 to 19, each projection 6A-6J forming a locking ramp of the vessel 2 thus becomes inserted in the corresponding opening between its bottom and top edges (e.g. 70A and 71A, cf. FIG. 19), the deformed bottom edge 70A coming into abutment against the corresponding projection 6A in order to prevent the lid 3 being separated from the vessel 2.

Having recourse to a radially deformed opening edge 70A-70J for forming the active mechanical face of a locking projection is found to be particularly advantageous since it makes it possible to obtain a projection that is extremely strong and that withstands bending, with a high second moment of area relative to the vertical direction represented by the central axis X-X'.

The orthogonal projection of each opening 7A-7J onto a radial plane is preferably in the form of an elongate slot that is substantially rectilinear or arcuate and that extends longitudinally in a direction that is generally horizontal.

Figure 11:
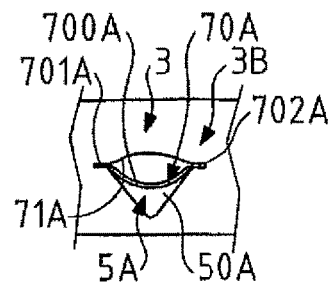
FIG. 11 is a diagrammatic face view of an example shape for the lid ramp, corresponding to the shape used in the pressure cooker of FIGS. 1 to 10.
Figure 12:
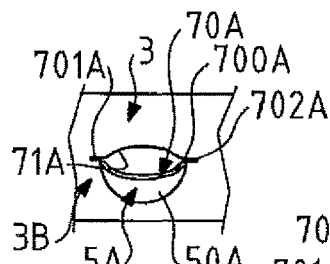
FIGS. 12 and 13 are diagrammatic face views showing alternative shapes for lid ramps that could be used instead of or in association with the ramps of FIG. 11.
Figure 13:
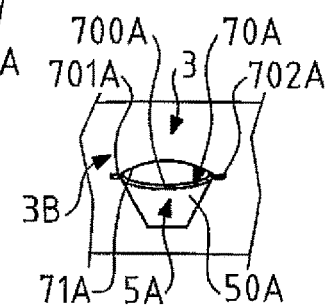

By way of example, each opening 7A-7J (in the variants of FIGS. 1 to 19) prior to radial deformation of the edge 70A-70J is in the form of a substantially straight or curved elongate slot that lies substantially in a mean extension plane that is perpendicular to the vertical central axis X-X'. Each opening 7A-7J is preferably made by localized removal of material from the corresponding shell of the lid 3 and/or of the vessel 2, e.g. by cutting. In the embodiment shown in FIGS. 1 to 19, each opening 7A-7J is thus cut out directly in the annular belt 3B. Advantageously, the edge 70A-70J is formed by a central portion 700A (cf. FIGS. 11 to 13) lying between two extreme portions 701A, 702A, with only said central portion being deformed radially in order to present a profile that is curved and thus forms a part of the projection 5A-5J adjacent to the opening 7A-7J, said extreme portions 701A, 702A themselves not forming parts of said projection 5A-5J. In the examples of FIGS. 11 to 13, the extreme portions 701A, 702A thus follow the curvature of the annular belt 3B, so as to lie in continuity therewith, unlike the central portion 700A that projects from the annular belt 3B, specifically towards the center of the lid 3, so as to form a kind of gusset having a free top edge that is to come to bear against the vessel ramps in order to lock the lid 3 relative to the vessel 2. In other words, the radial deformation seeking to form the projection 5A-5J is not formed over the entire length of the edge 70A-70J, but only over a central portion thereof (preferably constituting the major part of said edge 70A-70J), so as to avoid any uncontrolled tearing of material towards the ends of the edge 70A-70J under the effect of the deformation force that is exerted (e.g. by die-stamping) on the material forming the shell in order to form the projection 5A-5J.

Preferably, and as shown in particular by the variants of FIGS. 1 to 19 and 23, said projection 5A-5J adjacent to said opening 7A-7J is formed by a volume element, i.e. a three-dimensional element that presents a surface that is essentially not plane, being curved, e.g. warped. Such a volume element thus differs from a simple flat tongue. Said volume element presents opposite convex and concave faces 50A-50J and 51A-51J. In the embodiment shown in FIGS. 1 to 19, the projections adjacent to the respective openings 7A-7J form the projections 5A-5J of the first series secured to the lid 3, and specifically they project radially towards the inside of the lid 3, such that the convex face 50A-50J of each volume element is advantageously arranged facing the inside of the appliance 1. Said volume element is advantageously formed by localized radial deformation of the corresponding shell (of the vessel and/or of the lid). In other words, each volume element is advantageously formed by local volume deformation of the material constituting the shell of the vessel 2 and/or of the lid 3. Each volume element thus forms a protuberance that is made integrally with the shell in question (of the lid and/or of the vessel) and that projects from said shell so as to define on one side a convex face 50A-50J and on the other side, a "negative" concave face 51A-51J, e.g. corresponding to the imprint where a forming tool was applied. Having recourse to such volume elements for forming the first and/or the second series of projections of the bayonet locking means makes it easy, merely by deforming material, to obtain a projection that presents excellent mechanical properties, and in particular bending strength that is much greater than that of the metal tongues used in prior art bayonet locking means for pressure cookers. Having recourse to a volume element obtained by localized radial deformation of the shell of the lid 3 and/or of the vessel 2 makes it possible specifically to obtain a locking projection that presents a section of large second moment of area relative to the vertical axis along which locking forces are exerted by the corresponding projection of the other series. Furthermore, any hinge effect, which is particularly harmful to bending strength, is minimized by the three-dimensional nature of the volume element and by the fact it is made integrally with the shell from which it projects. This continuity of material (coming from the fact that the volume element is obtained by localized radial deformation) together with the volume nature of the projection that is obtained thereby lead to a locking ramp being obtained that is extremely rigid and that presents great resistance to bending, even when the volume element is very localized and does not extend over a significant length of the perimeter of the shell (of the lid 3 and/or of the vessel 2) from which it projects. In particular, the invention makes it easy to obtain locking projections 5A-5J presenting a ratio of length L over height H that is less than 4, preferably less than 3, and still more preferably less than 2.

By means of the invention, it is thus possible to obtain bayonet locking projections that do not need to be long, and that do not need to be made from sheet metal that is in order to present mechanical properties that are sufficient. This reduced length makes it possible significantly to reduce the size of the angular movement that is needed to make the first and second series of projections 5A-5J and 6A-6J cooperate with each other. Because of the small size of the volume elements, it is possible to go from the prelocking configuration of the lid 3 relative to the vessel 2 to the locked configuration of the lid 3 on the vessel 2 by relative rotation between the lid 3 and the vessel 2 through an angle that is relatively small, e.g. less than 30°, and more preferably less than 20°, e.g. about 15°.

Preferably, and as in the embodiment of FIGS. 1 to 16, said projection 5A-5J adjacent to said opening 7A-7J is formed by lancing. By way of example the opening 7A-7J may be obtained directly during the die-stamping operation, by localized and controlled tearing of the material forming the shell under the effect of that operation, or on the contrary it may be made before or after the deformation operation (e.g. cutting by means of a laser beam or some other cutting tool). Each projection 5A-5J may be formed by single lancing, as shown, or alternatively by double lancing. Having recourse to lancing is found to be particularly advantageous since it makes it possible to obtain a volume element that is particularly rigid with high resistance to bending, and that can be fabricated in a manner that is extremely simple, fast, and inexpensive.

As shown in FIGS. 1 to 16 and 23, said projection 5A-5J adjacent to said opening 7A-7J is advantageously formed by a shell defined by a peripheral edge that preferably forms part of said edge 70A-70J of said opening 7A-7J. Advantageously, said peripheral edge has a first portion localized on and attached to the corresponding shell and a second portion (e.g. formed specifically by the central portion 700A) that is free and that forms a bearing face against which a projection 6A-6J of the other series is to come to bear. Thus, the first portion of said peripheral edge lies at the surface of the shell from which the projection 5A-5J in question extends, while the second portion projects from said shell so as to form said locking projection 5A-5J. Advantageously, the free second portion of the peripheral edge of the shell specifically forming the projection 5A-5J lies substantially in a plane that is horizontal, perpendicular to the central axis X-X, and it preferably extends along a rounded profile between its two ends that are located on and attached to the shell from which the projection 5A-5J in question extends (i.e., in the embodiment shown in the figures, the annular belt 3B of the lid 3). Preferably, said first portion of the peripheral edge of the shell extends at least in part along an upwardly flared profile, e.g., a profile that is substantially V-shaped (FIG. 11) or U-shaped (FIGS. 12 and 13). As shown in the figures, said first peripheral edge portion of the shell extends longitudinally between two ends that correspond respectively to the two ends between which the second portion of the peripheral edge extends longitudinally as formed specifically by the central portion 700A of the edge 70A-70J of the opening 7A-7J in question. Thus, each projection extends in the vertical direction represented by the central axis X-X' between a root and a top, said top being formed by said second portion of the peripheral edge of the shell. Advantageously, said first portion is itself formed by at least two segments that converge towards each other going from the top towards the root.

Each projection 5A-5J, and likewise each adjacent opening 7A-7J, is preferably symmetrical about a radial midplane P0-P3. More precisely, in the example of FIG. 1, the first portion of the peripheral edge includes two inclined portions forming a V-shape with bottom ends meeting and with top ends that are connected by the radially deformed central portion 700A. In the embodiment of FIG. 12, the first portion of the peripheral edge of the shell presents a shape that is continuously rounded and that extends between two free top ends connected by the radially deformed central portion 700A. Finally, in the embodiment of FIG. 13, the first portion of the peripheral edge of the shell forming the volume element includes two sloping segments that are connected together by a horizontal segment so as to present an overall "boat" shape with free top ends that are connected by the radially deformed central portion 700A.

In particular when the projections 5A-5J present a V-shaped gusset as shown in FIGS. 1 to 16, they also act as a support for the sealing ring 4, which is thus held by the gusset in question when the lid 3 is separate from the vessel 2, and there is no need for any additional element for holding the sealing ring 4 relative to the lid 3. The sealing ring 4 is advantageously a lip gasket and that preferably presents circular symmetry, and it can also be easily separated from the lid 3 and still more easily put back into place because of the "conical" shape of the gusset forming the projections 5A-5J, which shape enables the sealing ring 4 to slide until it reaches its final position bearing against and on the free top edges 70A-70J of the gusset (cf. FIG. 10). The sealing ring 4 is advantageously designed to avoid penetrating locally inside said openings 7A-7J such that said openings 7A-7J thus advantageously do not form openings for indexing the sealing ring 4 relative to the lid 3 and/or to the vessel 2, nor do they form openings in which the sealing ring 4 might be extruded or creep, thereby enabling the sealing ring 4 to project through said openings in the event of abnormally high pressure.

Naturally, the invention is not in any way limited to the particular shape of the peripheral edge, even if a shape that substantially converges upwards, as shown in FIGS. 11 to 13, is found to be particularly advantageous by making it easier for the projections 5A-5J to become automatically positioned in the corresponding notches 61A-61J formed through the annular rim 60 of the vessel 2.

Figure 8:
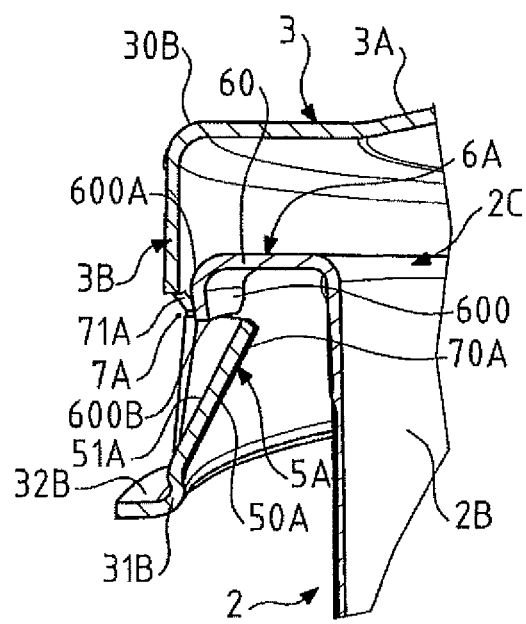
Figure 9:
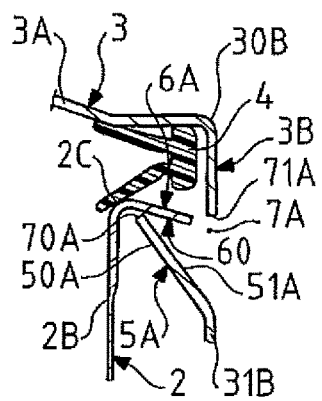
FIG. 9 is a diagrammatic section view showing the way in which the sealing ring is positioned within a pressure cooker in accordance with the invention when the lid is locked on the vessel.
Figure 10:
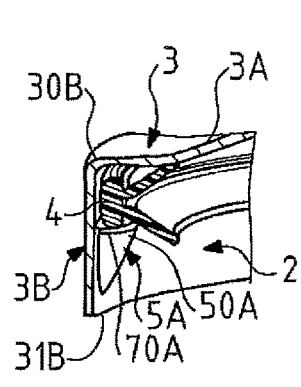
FIG. 10 is a fragmentary section view also showing the positioning of the sealing ring, but in a non-locked lid of a pressure cooker in accordance with the invention.

Advantageously, and as can be seen in particular in FIG. 8, each projection 5A-5J presents a profile that is flared from the root towards the top when seen in projection on a radial plane P0-P3. Thus, each projection 5A-5J is advantageously in the form of a gusset that converges downwards both in the radial plane P0-P3 and in the tangential plane (i.e. the plane of the sheet in FIGS. 11 to 13), thereby making it easier for the gusset to become automatically positioned in the corresponding notches 61A-61J formed through the annular rim 60 of the vessel 2.

Figure 14:
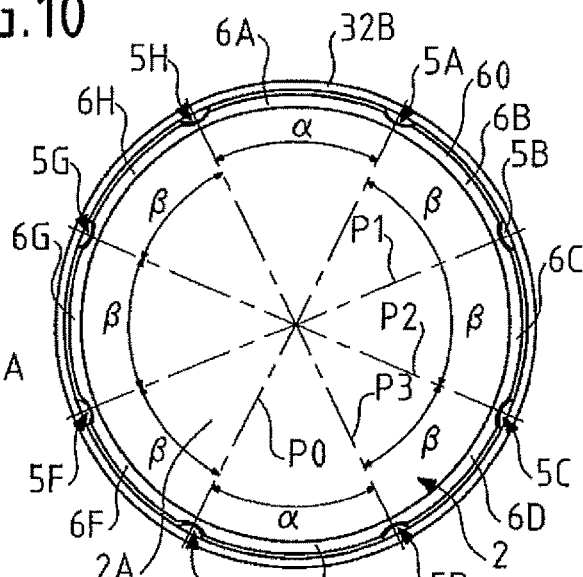
FIG. 14 is a view from beneath showing an appliance similar to that of the above figures (except in that the locking means have eight lid and vessel projections and not ten as in the variants of the above figures), in its unlocking configuration.
Figure 15:
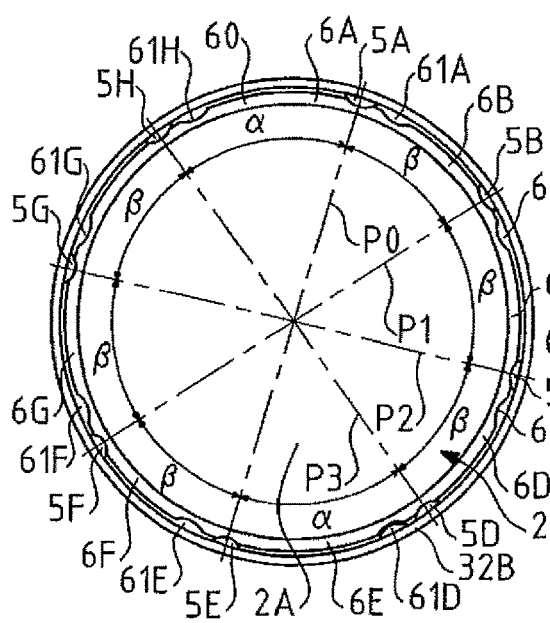
FIG. 15 is a view from beneath of the FIG. 14 appliance in its locking configuration.

It is also possible to envisage that the vessel and lid ramps are distributed at the same angular distance from one another. Nevertheless, in a preferred variant, as shown in FIGS. 14 to 16, the lid projections 5A-5J (specifically formed by die-stamped gussets), and also the corresponding notches 61A-61J formed through the annular rim 60 of the vessel 2, are angularly spaced apart at a first angle β, with the exception of four of them, which are spaced apart in pairs at a second angle α. Such an irregular angular configuration presents the following two advantages:

once the lid 3 is locked relative to the vessel 2 (FIG. 15), the second angle α, which is advantageously selected to be greater than the first angle β, creates a zone of preferred deformation in the metal structure where the sealing ring 4 can preferably escape (creep) in the event of abnormally high pressure, so as to create a leak of vapor and thus cause the internal pressure to drop; and using two different angles α and β enables the lid 3 to be put into place in only two different relative positions (one of which is shown in FIG. 14) that are symmetrical about the axis X-X'. In contrast, FIG. 16 shows that if the gussets 5A-5J of the lid 3 are not presented in the required position relative to the corresponding notches 61A-61J of the vessel 2, then only two of them 5A and 5E can be presented in register with notches in the vessel 2, thereby preventing any incorrect positioning of the vessel 2 relative to the lid 3.

Nevertheless, in order to improve force balancing, it is entirely possible to envisage either that the angles α and β are equal, in which case the gussets 5A-5J are regularly spaced apart angularly, or else that all of the gussets 5A-5J are regularly spaced apart angularly by the same angle with the exception of two of them that are spaced apart by a different angle, so as to allow the lid 3 to be put into place in only one relative position. Preferably, in the embodiments of FIGS. 1 to 16, the projections 5A-5J are localized on the annular belt 3B of the lid 3 at a distance from the free second circular edge 31B of said belt 3B so as to ensure that beneath the projections 5A-5J, the annular belt 3B forms a skirt for automatically centering the lid 3 relative to the vessel 2. By cooperating in almost continuous manner with the lateral rim 60 of the vessel 2 (with the exception of the notches 61A-61J), this automatic centering skirt enables the lid 3 to take up a centered position relative to the vessel 2 naturally and spontaneously when it is placed thereon.

The invention also relates as such to a method of fabricating an appliance 1 for cooking food under pressure, and in particular a method of fabricating an appliance 1 as described above. Consequently, the entire description above relating to the appliance 1 as such remains entirely valid and applicable mutatis mutandis to the method of fabrication of the invention, and vice versa.

The method in question is thus a method of fabricating an appliance 1 for cooking food under pressure and comprising at least:

a vessel 2 and a lid 3 for locking relative to the vessel 2 to cooperate therewith to form a cooking enclosure suitable for rising in pressure; and bayonet locking means forming first and second series of projections 5A-5J, 6A-6J that are secured respectively to the shell of the lid 3 and to the shell of the vessel 2 and that are for cooperating with one another in order to lock the lid 3 relative to the vessel 2.

According to the invention, said method comprises:

a step of forming a plurality of openings 7A-7J through at least one of said shells, each opening 7A-7J advantageously being defined by at least one respective edge 70A-70J; and a step of forming a plurality of projections 5A-5J each adjacent to a respective opening of said plurality of openings 7A-7J, said plurality of projections 5A-5J forming at least one of said first and second series of projections.

Preferably, said step of forming said plurality of projections 5A-5J comprises an operation of forming each of said projections 5A-5J by localized radial deformation of the corresponding shell. Advantageously, said localized radial deformation of the shell is performed by die-stamping the material constituting the shell. Nevertheless, it is entirely possible to envisage having recourse to any other technique for deforming the material, such as for example the hydroforming technique or the magnetoforming technique, without thereby going beyond the ambit of the invention.

Preferably, said step of making a plurality of openings 7A-7J is performed by an operation of laser cutting the corresponding shell, thus making it possible to cut accurately and quickly, it being understood that other cutting means could possibly be used.

Advantageously, said step of making a plurality of openings 7A-7J is performed before said step of forming said plurality of projections 5A-5J, thus advantageously making it possible to use the edges of each opening 7A-7J to form each of said projections 5A-5J by deforming the material constituting the shell in the vicinity of the opening, e.g. by stamping or by folding. The presence of the opening 7A-7J makes die-stamping easier and makes it possible to use a portion of the edge 70A-70J to form a bearing surface that is particularly rigid for interacting with a projection of the other series in order to lock the lid 3 relative to the vessel 2. Thus, in this particularly advantageous implementation shown in particular in FIGS. 1 to 16, said step of forming said plurality of projections 5A-5J includes a step of radially deforming each of said edges 70A-70J so that each of said edges 70A-70J forms a part of one of said projections 5A-5J, as described in detail above.

In the particularly advantageous implementation shown in FIGS. 1 to 16, the method begins with a step of die-stamping a disk-shaped metal blank in order to obtain a lid element in the form of a disk with a disk-shaped cover element 3A extended at its periphery by a dropped edge forming an annular belt 3B. The lid element as obtained in this way is then subjected to cutting operations seeking to form narrow slots through the annular belt 3B that correspond to the above-mentioned openings, being spaced apart from one another along the circumference of the belt 3B. Preferably, the slots are slightly arcuate so that at the end of the subsequent operation of localized radial deformation of the annular belt 3B for the purpose of forming the projections 5A-5J, the radially deformed edges 70A-70J lie in a plane that is substantially horizontal, thus forming a bearing face that is substantially horizontal and plane. Preferably, the cutting step in question is performed by attaching the lid element to a rotary chuck so as to present the different angular sectors of the annular belt 3B of the lid 3 in succession to a laser cutting beam, which makes the cuts that form the slots from the outside of the annular belt 3B. Thereafter, once the slots have been made in this way, volume elements are formed by pushing the bottom edge 70A-70J of each slot towards the inside of the lid 3, e.g. by die-stamping the material situated at said edge 70A-70J and beneath it, in order to obtain a series of locking "gussets" projecting from the inside face of the annular belt 3B and forming said projections 5A-5J.

In an alternative implementation of the fabrication method of the invention, it is also possible to make the openings (once more in the form of arcuate slots) in a flat metal strip and then to make the projections 5A-5J in the flat metal strip by die-stamping said flat metal strip at each of its openings 7A-7J in order to deform the corresponding bottom edge 70A-70J, and thus obtain a flat metal strip from which gussets project that are similar to those described above, which gussets are integrally formed with the flat metal strip. The method then includes a subsequent step of curving the metal strip with its gussets so as to obtain an annular belt having gussets projecting from its inside face. Thereafter, the method then includes an assembly operation (e.g. by welding) of assembling the belt provided with gussets as obtained in this way with a disk-shaped closure element so as to obtain a complete lid subassembly. In yet another possibility, the disk-shaped annular belt provided with gussets may be fitted to the inside face of an annular outer belt, which is itself already secured to the disk-shaped closure element.

With reference to the embodiment of FIGS. 17 to 19, the corresponding fabrication method is characterized by the fact that the step of making the openings 7A-7J may optionally be performed after the step of forming the associated projections 5A-5J. For example, in order to obtain the pressure cooker of FIGS. 17 to 19, a metal lid element is initially fabricated by die-stamping a disk-shaped metal blank so as to obtain a lid element having a disk-shaped cover element 3A that is extended at its periphery by an annular belt 3B. The annular belt 3B in question is then subjected to die-stamping operations for locally deforming the annular belt 3B, preferably along its entire height, so as to form radial projections that are directed towards the center of the lid 3. These radial projections are then cut so as to be provided with respective horizontal slots for passing and capturing the annular rim 60, as shown in the figures. In an alternative implementation, it is also possible to begin by cutting the annular belt 3B and then to die-stamp it in order to obtain the pressure cooker of FIGS. 17 to 19.

Figure 20:
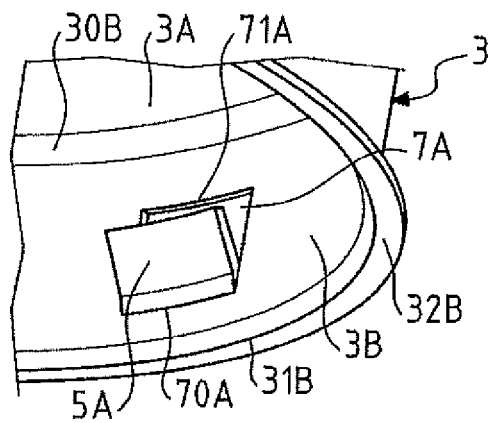
FIG. 20 is a fragmentary perspective view from below showing the lid of a pressure cooker in a third embodiment of the invention.
Figure 22:
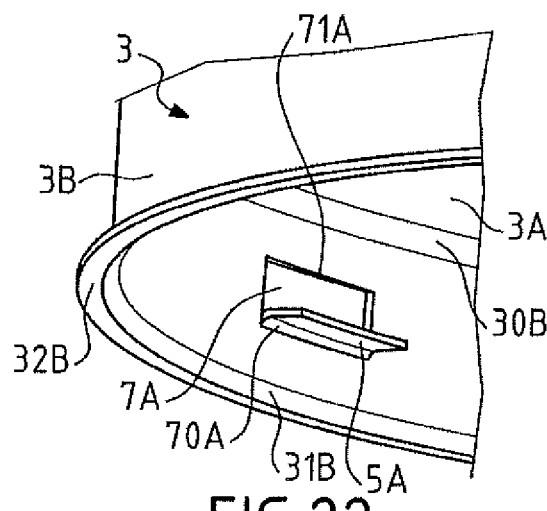
FIG. 22 is a fragmentary perspective view from below showing the lid of a pressure cooker in a fourth embodiment of the invention.
Figure 21:
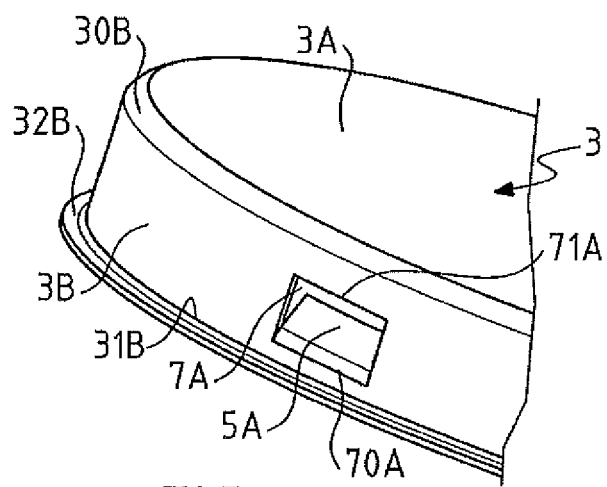
FIG. 21 is a fragmentary perspective view from above showing the FIG. 20 lid.

It is also perfectly possible to envisage having recourse to projections 5A-5J that are not formed by volume elements. For example, in the embodiments of FIGS. 20 to 22, each projection 5A-5J is in the form of a flat flap connected to the remainder of the shell via one of the edges 70A-70J of the corresponding openings 7A-7J. In this configuration, a cut following a generally U-shaped profile (specifically an upside-down U-shape) is made through the shell (in this example the annular belt 3B) so as to define the flap that may for example be substantially rectangular in shape and be attached to the remainder of the shell via one of its sides (specifically its bottom long side). Centripetal radial thrust is then exerted on the flap in question in order to fold it inwards by a movement in rotation about its bottom side attaching it to the remainder of the shell. This makes it possible simultaneously to form the projection 5A-5J and the corresponding opening 7A-7J, which is defined in particular by a bottom edge 70A-70J that is substantially rectilinear and that also forms the bottom edge of the flap. The flap may slope relative to the horizontal plane at an angle that is substantially zero (FIG. 22) or that is less than 90° (e.g. about 45°—FIGS. 20 and 21).

Figure 23:
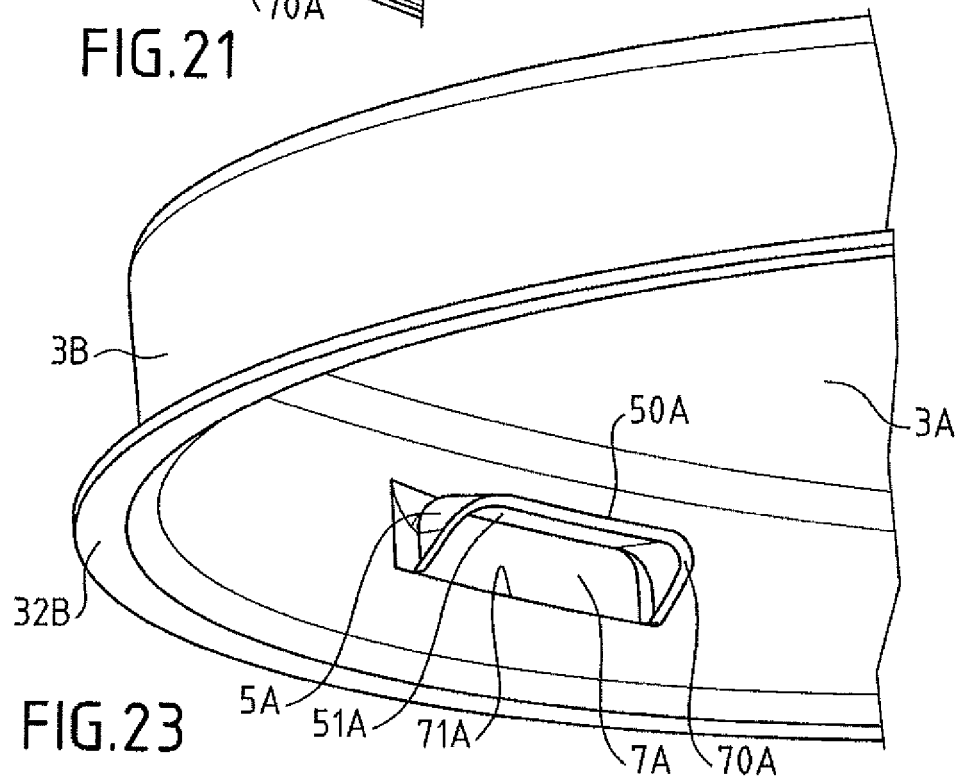
FIG. 23 is a fragmentary perspective view from below showing the lid of a pressure cooker in a fifth embodiment of the invention.

In the example of FIG. 23, the projections 5A-5J now present a volume characteristic and they are obtained on substantially the same principle as the gussets of FIGS. 1 to 16, except that the bearing and interlocking surface that is to come into contact with the projections 6A-6J of the other series is no longer formed directly by the edge 70A but rather by the convex surface 50A of the die-stamped volume element.

The vessel 2 is fabricated by way of example by die-stamping a metal blank, thus making it possible to obtain a cylindrical vessel element having a collar at its free top edge 2C that extends radially outwards. Said collar is then cut to form the notches 61A-61J for passing the locking projections 5A-5J of the lid 3.

To sum up, the invention makes it possible, in particular in the preferred embodiment shown in FIGS. 1 to 16, to obtain easily and at low cost a bayonet locking system that is particularly robust and effective, by optimizing the amount of material it requires by using metal of small thicknesses. Thus, in the embodiment of FIGS. 1 to 16, the invention makes it possible to fabricate a metal lid 3 from a blank having thickness of less than 1 millimeter (mm), and for example having thickness lying in the range 0.6 mm to 1 mm, and more preferably being about 0.9 mm. In the same manner, the vessel 2, with its annular rim 60, may be fabricated by forming a metal blank of initial thickness that is less than 1 mm, e.g. being about 0.8 mm or 0.9 mm, it being understood that performing certain forming techniques (die-stamping, stretching, . . . ) can lead to the side wall 2B of the vessel 2 presenting thickness that is less than the initial thickness of the blank and to the lateral rim 60 presenting a thickness that is greater than the initial thickness of the blank. Using other forming techniques (hydroforming, flowturning, . . . ) can lead to other thickness variations.

The pressure cooker of the invention thus presents weight that is significantly less than that of prior art bayonet pressure cookers.

Not only does the presence of openings 7A-7J formed through the lid 3 enable the user to see at a glance how the lid ramps are positioned, and possibly to visualize directly the mutual engagement of the vessel and lid ramps, but it also facilitates obtaining the locking ramps that present mechanical behavior that is remarkable, merely by deforming material in the vicinity of an opening.

The invention also makes it possible to obtain locking means made up of components that are made integrally with the vessel 2 and the lid 3, without requiring any separate parts to be fitted such as a clamp, lugs, jaws, or segments.

The invention claimed is:

1. An appliance for cooking food under pressure and comprising at least:
   a vessel and a lid for locking relative to the vessel and to cooperate therewith to form a cooking enclosure suitable for rising in pressure; and
   bayonet locking means forming first and second series of projections that are secured respectively to the shell of the lid and to the shell of the vessel and cooperate with one another in order to lock the lid relative to the vessel;
   wherein each projection of at least one of said first and second series of projections is adjacent to a respective opening formed through the corresponding shell.

2. The appliance according to claim 1, wherein said opening is defined by at least one edge that also contributes to defining said projection adjacent to said opening.

3. The appliance according to claim 2, wherein said edge of said opening forms a bearing face against which a projection of the other series is to come to bear.

4. The appliance according to claim 1, wherein said projection adjacent to said opening is formed by a deformed portion of the corresponding shell.

5. The appliance according to claim 4, said edge of said opening forms part of said deformed portion.

6. The appliance according to claim 4, wherein said deformed portion is obtained by die-stamping the corresponding shell.

7. The appliance according to claim 2, wherein said projection adjacent to said opening is formed by a shell defined by a peripheral edge forming part of said edge of said opening.

8. The appliance according to claim 7, wherein said peripheral edge comprises a first portion localized on and attached to the corresponding shell and a second portion that is free and forms a bearing face against which a projection of the other series is to come to bear.

9. The appliance according to claim 8, wherein said free second portion lies in a horizontal plane.

10. The appliance according to claim 1, wherein said projection adjacent to said opening is formed by lancing.

11. The appliance according to claim 1, wherein said projection adjacent to said opening is formed by a volume element presenting opposite convex and concave faces.

12. The appliance according to claim 2, wherein said edge of said opening is formed by a central portion between two extreme portions, only said central portion being radially deformed in order to present a curved profile and thus form part of the projection adjacent to the opening, said extreme portions not forming parts of said projection.

13. The appliance according to claim 1, wherein said projections adjacent of the respective openings form the projections of the first series that are secured to the shell of the lid.

14. The appliance according to claim 13, wherein the shell of the lid includes a disk-shaped cover element together with an annular belt that extends between a first circular edge secured to the disk-shaped cover element and a second annular edge that is free, said openings being located in said belt, at a distance from said first and second circular edges.

15. The appliance according to claim 13, wherein said projections of the first series project radially towards an inside of the lid.

16. The appliance according to claim 13, wherein the vessel comprises a bottom together with an annular side wall that extends between said bottom and a free top edge defining an opening giving access to the inside of the vessel, the projections of the second series being formed by an annular rim that projects outwards from said free top edge, notches being formed through said annular rim to pass said projections of the first series.

17. The appliance according to claim 16, wherein said annular rim includes a collar that extends radially outwards from said free top edge, together with a skirt that extends downwards between a top edge secured to the collar and a free bottom edge against which the projections of the first series are to come to bear in order to lock the lid relative to the vessel.

18. A method of fabricating an appliance for cooking food under pressure, said appliance comprising at least:
   a vessel and a lid for locking relative to the vessel and to cooperate therewith to form a cooking enclosure suitable for rising in pressure; and
   bayonet locking means forming first and second series of projections that are secured respectively to the shell of the lid and to the shell of the vessel and cooperate with one another in order to lock the lid relative to the vessel;
   said method comprising the steps of:
      forming a plurality of openings through at least one of said shells; and
      forming a plurality of projections each adjacent to a respective opening of said plurality of openings, said plurality of projections forming at least one of said first and second series of projections.

19. The method according to claim 18, wherein said step of forming said plurality of projections comprises an operation of forming each of said projections by localized radial deformation of the corresponding shell.

20. The method according to claim 18, wherein said step of making a plurality of openings is performed before said step of forming said plurality of projections.

21. The method according to claim 18, wherein each opening of said plurality of openings is defined by at least one respective edge, and said step of forming said plurality of projections including a step of radially deforming each of said edges so that each of said edges forms a part of one of said projections.

22. The method according to claim 18, wherein said step of making a plurality of openings is performed by an operation of laser cutting the corresponding shell.

23. The method according to claim 19, wherein said localized radial deformation of the shell is performed by die-stamping the material constituting the shell.

* * * * *